Aug. 26, 1969  R. J. KERSTING  3,463,556

CONTROL VALVE

Filed April 25, 1968

INVENTOR
RAYMOND J. KERSTING
BY
*Joseph E. Papin.*

3,463,556
CONTROL VALVE

Raymond J. Kersting, Dellwood, Mo., assignor to Wagner Electric Corporation, Newark, N.J., a corporation of Delaware
Filed Apr. 25, 1968, Ser. No. 724,031
Int. Cl. B60t 13/46

U.S. Cl. 303—22                     7 Claims

ABSTRACT OF THE DISCLOSURE

A load sensitive proportioning valve for use on a vehicle having air suspension means and a brake system including a master cylinder and a brake motor, said proportioning valve effecting a proportional application to the brake motor of fluid pressure supplied thereto from the master cylinder and also being responsive to the fluid pressure in the air suspension system to vary the value at which the proportional application of the supplied fluid pressure occurs.

---

Figure 1:
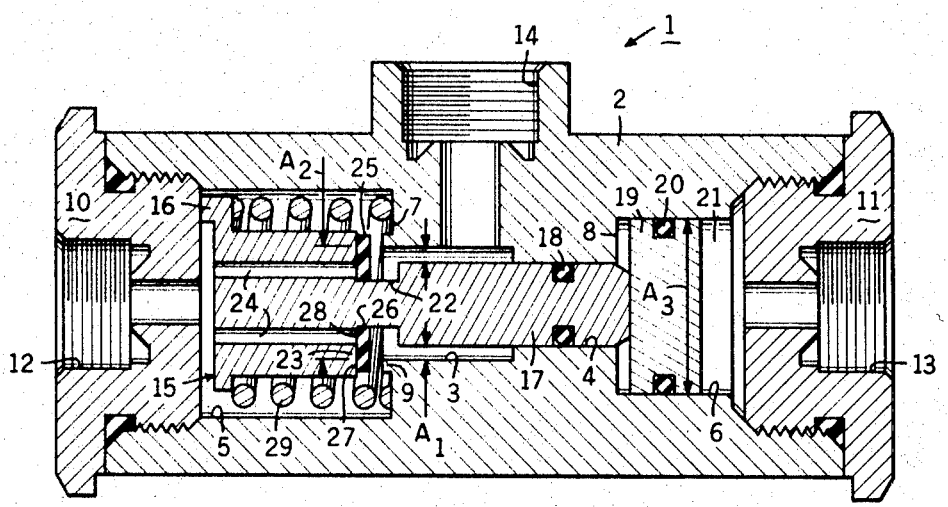

This invention relates to control valves in a vehicle braking system and is particular to proportioning valves which are responsive to the load condition of the vehicle.

In the past, load sensitive proportioning valves were employed for the most part on vehicles having straight air systems, and one of the disadvantageous or undesirable features of such past load sensitive proportioning valves was the rather complex construction necessary to effect efficient operation, i.e., valve members within a movable control casing, differential diaphragms, etc.

The principal object of the present invention is to provide a load snesitive control valve of simplified construction which overcomes the aforementioned disadvantageous or undesirable features, and this, as well as other objects and advantageous features of the present invention, will become apparent in the specification which follows.

Briefly, the present invention comprises a load sensitive proportioning valve having a housing with a pressure fluid flow passage therethrough, a valve seat integral with said housing about said flow passage, means for engagement with said valve seat and responsive to fluid pressure supplied to said flow passage from a vehicle master cylinder in excess of a selected value to effect a metered proportional application of the supplied fluid pressure therethrough to a vehicle brake motor, and said means also being responsive to variations in the fluid pressure of a vehicle air suspension system to alter the selected value at which the metered proportional application of the supplied fluid pressure occurs.

Figure 2:
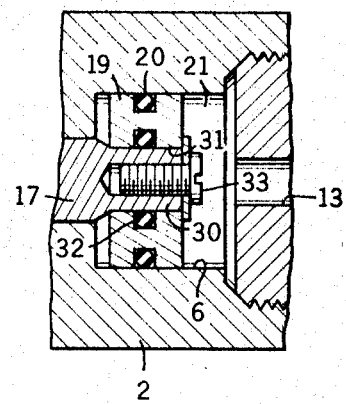
Figure 3:
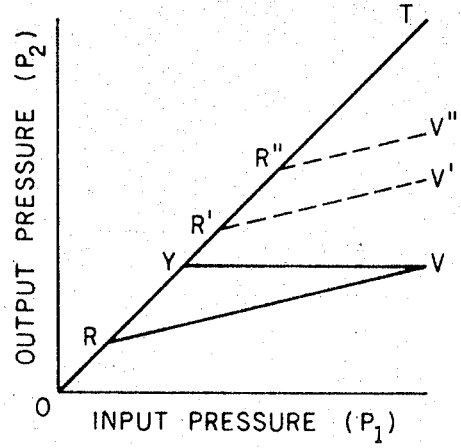

In the drawing wherein like numerals refer to like parts wherever they occur:

FIG. 1 is a sectional view showing a control valve embodying the present invention in cross-section, FIG. 2 is a fragmentary sectional view of the control valve of FIG. 1 showing an alternate construction in cross-section which is also embodied in the present invention, and FIG. 3 is a graphical representation illustrating the output fluid pressure effected by the control valve of FIG. 1 in response to the input fluid pressure and as altered by the control fluid pressure.

Referring now to the drawings in detail and in particular to FIG. 1, a control or load sensitive proportioning valve 1 is provided with a housing 2 having stepped bores 3, 4 therein interposed between opposed counterbores 4, 5, and opposed shoulders 7, 8 are respectively defined on said housing between the steppd bore 3 and the counterbore 5 and between the stepped bore 4 and the counterbore 6, said shoulder 7 having a valve seat 9 defined thereon in circumscribing relation with the stepped bore 3 and facing the counterbore 5. Closure members or end plugs 10, 11 are threadedly received in the open ends of the counterbores 5, 6 defining end walls thereof, and outlet and control ports 12, 13 are provided through said closure members 10, 11 for connection with a vehicle brake motor (not shown) and a vehicle air suspension system (not shown), respectively. An inlet port 14 for connection with a vehicle master cylinder (not shown) is provided in the housing 2 intersecting the stepped bore 3 adjacent the mid-portion thereof.

A resiliently urged proportioning or metering member, such as the piston indicated generally at 15, is provided with an abutment flange 16 which is slidably received in the counterbore 5, and an integral extension or stem portion 17 is provided on said piston being slidable in the stepped bore 4 and extending coaxially through the stepped bore 3, said stem having a peripheral seal 18 therein in sealing engagement with the stepped bore 4. The rightward or free end of the stem 17 extends coaxially into the counterbore 6 for driven engagement with another piston 19 which is slidably received in said counterbore, said piston 19 having a peripheral seal 20 sealably engaged with said counterbore, and an expansible air or fluid pressure chamber 21 is defined in the counterbore 6 between the piston 19 and the closure member 11 in open pressure fluid communication with the control port 13 at all times. The leftward end of the extension 17 is provided with a peripheral recess 22 which defines with the piston 15 a seating shoulder 23 thereon, and a plurality of return or reverse flow passages 24 are provided through said piston intersecting with said seating shoulder. An annular valve member or element 25 is provided with a centrally located aperture 26 therethrough which is slidably received on the annular base portion of the extension peripheral recess 22. The valve element 25 is normally positioned against the piston seating shoulder 23 having a radially outer portion 27 for sealing engagement with the valve seat 9 and a radially inner portion 28 adjacent to the aperture 26 defining a uni-directional or check valve which is normally sealably engaged with said piston seating shoulder about the return flow passages 24. A proportioning or metering spring 29 is engaged between the housing shoulder 7 and the piston abutment flange 16 normally urging said abutment flange into abutting engagement with the closure member 10 and urging the valve element 25 toward a position disengaged from the housing valve seat 9 to establish open pressure fluid communication between the inlet and outlet ports 14, 12.

It should be noted that the piston 15 is provided with an annular effective area $A_1$ responsive to the fluid pressure at the inlet port 14 and generally defined by the difference between the effective cross-sectional sealing area of the extension seal 18 with the stepped bore 4 and the area $A_2$ also provided on the piston 15. The area $A_2$ is responsive to the fluid pressure at the outlet port 12 and is generally defined by the sealing engagement of the valve element 25 with the valve seat 9, said area $A_2$ being opposed to and predeterminately greater than the area $A_1$. To complete the description of the control valve 1, it should also be noted that another effective area $A_3$, which is generally defined by the cross-sectional sealing area of the piston seal 20 with the housing counterbore 6, is provided on the piston 19 and subjected to the fluid pressure at the control port 13 and in the control chamber 21 at all times, said area $A_3$ being additive to the area $A_1$ and opposed to the area $A_2$.

Referring now to FIG. 2, an alternate construction of the control valve 1 is shown merely to illustrate that the pistons 15, 19 can, if desired, be considered as an integral structure. For instance, a reduced portion 30 is provided on the free end of the extension 17 which is received in a bore 31 provided through the piston 19, and a seal 32 is carried in said bore in sealing engagement with said reduced portion. The piston 19 is retained against displacement from the reduced portion 30 for concerted movement with the piston 15 and extension 17 by suitable means, such as a screw 33.

In the operation with the component parts of the control valve 1 in their inoperative or normal positions, as shown, and with the air pressure $Pa$ from the air suspension system at the control port 13 at atmosphere, the supplied or input fluid pressure $P_1$ supplied to the inlet port 14 from the vehicle master cylinder (not shown) flows therefrom through the housing stepped bore 3 and counterbore 5 to establish an applied or output fluid pressure $P_2$ at the outlet port 12 which is applied to the vehicle brake motor (not shown), said input fluid pressure $P_1$ acting on the effective area $A_1$ of the piston 15 to establish an input force $P_1A_1$ urging the piston abutment 16 toward engagement with the closure member 10 and said output fluid pressure $P_2$ acting on the area $A_2$ of the piston 15 to establish an output force $P_2A_2$ opposite to the input force $P_1A_1$. When the input and output fluid pressures $P_1$, $P_2$ attain a predetermined or selected value R, as shown on the line OT in the graph of FIG. 3, the output force $P_2A_2$ overcomes the input force $P_1A_1$ and the additive compressive force $Fs$ of the metering spring 29 to concertedly move the pistons 15, 19 and the extension 17 rightwardly toward an interrupting or proportioning position engaging the valve element 25 with the housing seat 9 to interrupt pressure fluid communication between the inlet and outlet ports 14, 12. When the input fluid pressure $P_1$ is increased along the line OT in the graph of FIG. 3 to a value in excess of the predetermined value R, the input force $P_1A_1$ is correspondingly increased, and the increased input force $P_1A_1$ assisted by the spring force $Fs$ urges the piston 15 leftwardly toward a metering position against the opposing output force $P_2A_2$. This leftward movement of the piston 15 disengages the valve element 25 from the housing valve seat 9 to establish metered pressure fluid communication between the inlet and outlet ports 14, 12 and effect a proportional increase in the output fluid pressure $P_2$ along the line RV in the graph of FIG. 3 in the following ratio:

$$P_2 = \frac{P_1A_1 + Fs}{A_2}$$

The proportional increase in the output fluid pressure $P_2$ effects a corresponding increase in the output force $P_2A_2$, and when the increased output force $P_2A_2$ attains a value greater than the opposing increased input force $P_1A_1$ and the additive spring force $Fs$, the piston 15 is again moved rightwardly to the interrupting position to re-engage the valve element 25 with the housing valve seat 9 and again interrupt pressure fluid communication between the inlet and outlet ports 12, 14. If the input fluid pressure $P_1$ is further increased, the component parts of the control valve 1 function in the same manner as described hereinbefore to effect further proportional increases in the output fluid pressure $P_2$.

When the desired braking effort is attained, the master cylinder is de-actuated to eliminate the input fluid pressure $P_1$, and when the input fluid pressure $P_1$ is so decreased along the line OT of the graph in FIG. 3 below the value of the output fluid pressure $P_2$ on the line RV of said graph, a fluid pressure differential is established across the valve element 25 acting to displace the radially inner or check valve portion 28 thereof from engagement with the piston seating shoulder 23 thereby permitting the return flow of the displaced output fluid pressure $P_2$ through the piston passages 24 and the valve element central aperture 26 to the inlet port 14. This return flow of the displaced output fluid pressure $P_2$ is illustrated along the line VY in the graph of FIG. 3. When the input and output fluid pressures $P_1$, $P_2$ are so reduced to a value less than the predetermined value R, the reduced input force $P_1A_1$ and the additive spring force $Fs$ overcomes the reduced output force $P_2A_2$ and moves the piston 15 to the original position with the piston abutment flange 16 engaged with the closure member 10 and the valve element 25 disengaged from the housing valve seat 9 re-establishing open pressure fluid communication between the inlet and outlet ports 14, 12.

When the control port 13 is subjected to the air pressure $Pa$ from the air suspension system of the vehicle, it is, of course, apparent that the air pressure $Pa$ will be incrementally variable and in a direct proportion to weight or load added to or taken from the vehicle. The air pressure $Pa$ at the control port 13 flows into the control chamber 21 acting on the area $A_3$ of the piston 19 therein to establish a control force $PaA_3$ and drivingly engage said piston with the rightward end of the extension 17. When the piston 15 is in the interrupting position with the valve element 25 engaged with the valve seat 9, the control force $PaA_3$ is additive to the input force $P_1A_1$ and the spring force $Fs$ to again actuate the piston 15 to the metering position and effect a proportional increase in the output fluid pressure $P_2$ along one of many incrementally variable lines parallel to the line RV, such as for instance the line R'V' in the graph of FIG. 3, in the following ratio:

$$P_2 = \frac{P_1A_1 + F_s + PaA_3}{A_2}$$

The proportional increase in the output fluid pressure $P_2$ effects a corresponding increase in the output fluid pressure $P_2$ and when the increased output force $P_2A_2$ attains a value greater than the opposing increased input force $P_1A_1$ and the additive control force $PaA_3$ and spring force $Fs$, the pistons 15, 19 are concertedly moved rightwardly to the interrupting position to re-engage the valve element 25 with the housing valve seat 9 and again interrupt pressure fluid communication between the inlet and outlet ports 14, 12. As the vehicle load is further increased, the control or air spring pressure $Pa$ also increases to effect an increased control force $PaA_3$, and such increases in the control force $PaA_3$ are additive to the input force $P_1A_1$ and the spring force $Fs$ to establish a different proportionally increased output fluid pressure $P_2$ in the same manner as described hereinabove and as illustrated, for instance, along the line R"V" in the graph of FIG. 3. From the foregoing, it is obvious that variations in the control fluid pressure $Pa$ not only proportionally alters the output fluid pressure $P_2$ but also alters the selected or predetermined value R at which the proportioning function of the control valve 1 occurs. In other words, the output fluid pressure $P_2$ is proportionally variable in a direct relation with the load condition or magnitude of the vehicle in order to proportionally vary the braking effort of the vehicle with regard to the vehicle load. Of course, in the event the vehicle is very heavily loaded, the control fluid pressure $Pa$ and control force $PaA_3$ may be increased to magnitudes which, when added to the additive input and spring forces $P_1A_1$ and $Fs$, overcome the output force $P_2A_2$ to obviate the metering or proportioning function of the piston 15 wherein the abutment flange 16 thereof would be urged into abutting engagement with the closure member 10 to maintain the valve element 25 displaced from the valve seat 9 and effect a 1:1 ratio between the input and output fluid pressures $P_1$, $P_2$, as illustrated along the line OT in the graph of FIG. 3.

From the foregoing, it is now apparent that a novel control or load sensitive proportioning valve 1 meeting the objects set out hereinbefore, as well as other objects and advantageous features developed in the disclosure, is provided and that changes or modifications as to the precise configurations, shapes and details of the construction set forth in the disclosure by way of illustration may be made by those skilled in the art without departing from the spirit of the invention.

I claim:

1. A control valve comprising a housing, passage means in said housing for the application therethrough of supplied fluid pressure, a valve seat integral with said housing and in circumscribing relation with said passage means, other means movable in said flow passage for engagement with said valve seat, a pair of opposed differential areas on said other means for respective subjection to the supplied and applied fluid pressures, resilient means urging said other means toward a position disengaged from said valve seat to normally effect the application through said flow passage of the supplied fluid pressure, said other means being initially movable against the force of said resilient means in response to applied and supplied fluid pressures of a predetermined value acting on said opposed differential areas into engagement with said valve seat to close said passage means and isolate the applied and supplied fluid pressures and said other means also being thereafter movable in response to increases in the supplied fluid pressure in excess of the predetermined value acting on one of said differential areas and assisted by the force of said resilient means toward a metering position disengaged from said valve seat to effect a metered increase in the applied fluid pressure acting on the other of said differential areas in a predetermined ratio with the increased supplied fluid pressure in excess of the predetermined value, said other means defining with said housing an expansible fluid pressure chamber for subjection to a variable control fluid pressure, a third area on said other means for subjection to the variable control fluid pressure in said chamber and additive to said one differential area, said third area being responsive to the variable control fluid pressure to oppose movement of said other means into engagement with said valve seat, other passage means in said other means, and uni-directional valve means controlling said other passage means, said valve means being movable only in response to the magnitude of the applied fluid pressure acting thereon in excess of that of the supplied fluid pressure toward a position establishing only the return flow of the applied fluid pressure through said other passage means and said first named passage means when said other means is engaged with said valve seat.

2. In combination with a vehicle having air suspension means, and a brake system including a master cylinder, a brake motor, and a proportioning valve between said master cylinder and brake motor: said proportioning valve comprising a housing, inlet, outlet and control ports in said housing for respective connection to said master cylinder, said brake motor and said air suspension means, a valve seat integral with said housing between said inlet and outlet ports, other means movable in said housing for engagement with said valve seat, a pair of opposed differential areas on said other means for respective subjection to the fluid pressure at said inlet and outlet ports, resilient means urging said other means toward a position disengaged from said valve seat, said other means being initially movable against said resilient means in respons to fluid pressures at said inlet and outlet ports of a predetermined value acting on said opposed differential areas toward a position engaged with said valve seat and said other means also being thereafter further movable in response to increases in the fluid pressure at said inlet port in excess of the predetermined value acting on one of said differential areas assisted by said resilient means toward a metering position disengaged from said valve seat to effect a metered increase in the fluid pressure at said outlet port in excess of the predetermined value acting on the other of said differential areas in a predetermined ratio with the increased fluid pressure at said inlet port, a third area on said other means additive to said one differential area for subjection to fluid pressure at said control port, said third area being responsive to fluid pressure at said third port to oppose movement of said other means toward engagement with said valve seat, passage means in said other means for connection in pressure fluid communication between said inlet and outlet ports when said other means is engaged with said valve seat, and uni-directional valve means subjected to the fluid pressures at said inlet and outlet ports for controlling said passage means, said valve means being movable toward a position establishing only the return flow of the displaced fluid pressure at said outlet port through said passage means to said inlet port in response to the magnitude of the fluid pressure at said outlet port in excess of that of the fluid pressure at said inlet port acting thereon when said other means is engaged with said valve seat.

3. The control valve according to claim 2, comprising abutment means on said housing and spaced from said valve seat, said other means including a piston movable in said housing between said inlet and outlet ports, said opposed differential areas being defined on said piston, a stem on said piston movable in said housing and having an end portion subjected to fluid pressure at said control port, said third area being defined on said end portion, and valve means on said piston for engagement with said valve seat, said resilient means being engaged between said housing and said piston normally urging said piston toward engagement with said abutment means and said valve means from said valve seat.

4. In combination with a vehicle having air suspension means, and a brake system including a master cylinder, a brake motor, and a proportioning valve between said master cylinder and brake motor: said proportioning valve comprising a housing, inlet, outlet and control ports in said housing for respective connection to said master cylinder, said brake motor and said air suspension means, a valve seat integral with said housing between said inlet and outlet ports, other means movable in said housing for engagement with said valve seat, a pair of opposed differential areas on said other means for respective subjection to the fluid pressure at said inlet and outlet ports, resilient means urging said other means toward a position disengaged from said valve seat, said other means being initially movable against said resilient means in response to fluid pressures at said inlet and outlet ports of a predetermined value acting on said opposed differential areas toward a position engaged with said valve seat and said other means also being thereafter further movable in response to increases in the fluid pressure at said inlet port in excess of the predetermined value acting on one of said differential areas assisted by said resilient means toward a metering position disengaged from said valve seat to effect a metered increase in the fluid pressure at said outlet port in excess of the predetermined value acting on the other of said differential areas in a predetermined ratio with the increased fluid pressure at said inlet port, a third area on said other means additive to said one differential area for subjection to fluid pressure at said control port, said third area being responsive to fluid pressure at said third port to oppose movement of said other means toward engagement with said valve seat, a pair of stepped bores in said housing connected between a pair of opposed counterbores, said inlet port being connected with one of said stepped bores, said outlet port being connected with one of said counterbores, said cotnrol port being connected with the other of said counterbores, a shoulder on said housing between said one stepped bore and said one counterbore defining said valve seat, and said other means including piston means slidable in said counterbore, said opposed differential areas being defined on said piston means, extension means slidable in the other of said stepped bores and having opposed portions, one of said opposed portions extending through said one stepped bore and being integrally connected with said piston means and the other of said opposed portions extending into said other counterbore, said third area being defined on said other opposed portion, and valve means on said piston means for engagement with said valve seat, said resilient means being engaged between said shoulder and said piston means urging said valve means from said valve seat.

5. In combination with a vehicle having air suspension means, and a brake system including a master cylinder, a brake motor, and a proportioning valve between said master cylinder and brake motor: said proportioning valve comprising a housing, inlet, outlet and control ports in said housing for respective connection to said master cylinder, said brake motor and said air suspension means, a valve seat integral with said housing between said inlet and outlet ports, other means movable in said housing for engagement with said valve seat, a pair of opposed differential areas on said other means for respective subjection to the fluid pressure at said inlet and outlet ports, resilient means urging said other means toward a position disengaged from said valve seat, said other means being initially movable against said resilient means in response to fluid pressures at said inlet and outlet ports of a predetermined value acting on said opposed differential areas toward a position engaged with said valve seat and said other means also being thereafter further movable in response to increases in the fluid pressure at said inlet port in excess of the predetermined value acting on one of said differential areas assisted by said resilient means toward a metering position disengaged from said valve seat to effect a metered increase in the fluid pressure at said outlet port in excess of the predetermined value acting on the other of said differential areas in a predetermined ratio with the increased fluid pressure at said inlet port, a third area on said other means additive to said one differential area for subjection to fluid pressure at said control port, said third area being responsive to fluid pressure at said third port to oppose movement of said other means toward engagement with said valve seat, a pair of stepped bores in said housing connected between a pair of opposed counterbores, said inlet port being connected with one of said stepped bores, said outlet port being connected with one of said counterbores, said control port being connected with the other of said counterbores, a shoulder on said housing between said one stepped bore and said one counterbore defining said valve seat, said other means including a piston slidable in said one counterbore, said opposed differential areas being defined on said piston, a reduced extension on said piston slidable in the other of said stepped bores and having an end portion extending into said other counterbore, another piston slidable in said other counterbore for driving engagement with said extension end portion and defining with said other counterbore an expansible fluid pressure chamber connected in pressure fluid communication with said control port, said third area being defined on said other piston in said chamber, and valve means on said first named piston for engagement with said valve seat, abutment means in said one counterbore opposed to and spaced from said shoulder, and said resilient means including a spring having opposed ends respectively engaged between said shoulder and said first named piston normally urging said first named piston toward engagement with said abutment means and said valve means from said valve seat.

6. The control valve according to claim 5, comprising another shoulder on said first named piston about said extension, passage means in said first named piston for connection between said inlet and outlet ports and intersecting said other shoulder, said valve means including a valve element engaged with said shoulder and having a radially outer portion for engagement with said valve seat, a central aperture in said valve element slidable on said extension, a radially inner portion on said valve means adjacent to said aperture and normally engaged with said shoulder about said passage means, said radially inner portion being movable toward a position disengaged from said other shoulder to establish only the return flow of the displaced fluid pressure at said outlet port through said passage means and said aperture to said inlet port in response to the magnitude of the fluid pressure at said outlet port acting thereon in excess of that of the fluid pressure at said inlet port acting thereon only when the radially outer portion of said valve element is engaged with said other shoulder and said valve seat.

7. A control valve comprising a housing, metering means movable in said housing for controlling the application through said housing of fluid pressure supplied thereto, said metering means being movable in response to supplied and applied fluid pressures of a predetermined value toward an isolating position in said housing to isolate the supplied fluid pressure from the applied fluid pressure and being thereafter further movable in response to increases in the supplied fluid pressure in excess of the predetermined value toward a metering position to establish metered pressure fluid communication between the supplied and applied fluid pressures and effect a metered increase in the applied fluid pressure in a predetermined ratio with the increases in the supplied fluid pressure in excess of the predetermined value, said metering means including a portion for subjection to a control fluid pressure to oppose and assist movement of said metering means toward its isolating and metering positions, respectively, said metering means being actuated toward its isolating position in response to supplied and applied fluid pressures of another value different than the predetermined value and actuated toward its metering position to effect metered increases in the applied fluid pressure in another ratio different than the predetermined ratio upon the subjection of said portion to the control fluid pressure, and other means in said metering means including valve means for subjection to the supplied and applied fluid pressures when said metering means is in its isolating position, said valve means being movable in response to the applied fluid pressure to establish only the return flow thereof upon the reduction of the supplied fluid pressure acting thereon to a value less than that of the applied fluid pressure when said metering means is in its isolating position.

References Cited

UNITED STATES PATENTS

| | | | |
|---|---|---|---|
| 3,153,560 | 10/1964 | Henry-Biabaud | 303—22 |
| 3,169,800 | 2/1965 | Oberthur | 303—22 |
| 3,191,999 | 6/1965 | Cordiano | 303—22 |

MILTON BUCHLER, Primary Examiner

J. J. McLAUGHLIN, Jr., Assistant Examiner

U.S. Cl. X.R.

137—493.7; 188—152; 303—6